US006321349B1

(12) United States Patent
Hennessy

(10) Patent No.: US 6,321,349 B1
(45) Date of Patent: *Nov. 20, 2001

(54) METHOD AND APPARATUS FOR DEVELOPING AND DEBUGGING PORTABLE COMPUTERS VIA A PERIPHERAL INTERFACE SLOT

(75) Inventor: Rick Hennessy, Lunenburg, MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,597

(22) Filed: Jun. 30, 1998

(51) Int. Cl.[7] .................................................. G06F 11/25
(52) U.S. Cl. ............................... 714/39; 714/30; 370/241
(58) Field of Search ............................. 714/30, 726–730, 714/731, 39; 370/241

(56) References Cited

U.S. PATENT DOCUMENTS

| | | | |
|---|---|---|---|
| 4,778,411 | * 10/1988 | Rudy, Jr. et al. | 439/681 |
| 5,251,150 | * 10/1993 | Ladner et al. | 702/127 |
| 5,515,540 | * 5/1996 | Grider et al. | 713/200 |
| 5,544,311 | * 8/1996 | Harenberg et al. | 714/40 |
| 5,828,546 | * 10/1998 | Tirrell et al. | 361/685 |
| 5,937,154 | * 8/1999 | Tegethof | 714/30 |
| 6,075,773 | * 6/2000 | Clark et al. | 370/241 |

* cited by examiner

Primary Examiner—Thomas Lee
Assistant Examiner—Gautam R. Patel
(74) Attorney, Agent, or Firm—Conley, Rose & Tayon, P.C.

(57) ABSTRACT

A portable computer includes a housing having an outside surface. A processor is contained within the housing and has a bus port and a debug port. A debug connector is mounted at the outside surface of the computer housing and is operatively connected to the debug port. The computer housing can include at least one peripheral interface slot defined by a portion of the outside surface of the computer, and the debug connector can be located in the peripheral interface slot.

12 Claims, 2 Drawing Sheets

METHOD AND APPARATUS FOR DEVELOPING AND DEBUGGING PORTABLE COMPUTERS VIA A PERIPHERAL INTERFACE SLOT

FIELD OF THE INVENTION

This invention relates generally to methods and apparatus for developing and debugging portable computers.

BACKGROUND OF THE INVENTION

As microprocessors have become more complex, they are now often equipped with a debug port. This port is typically an electrical interface that provides access to various parts of the processor circuit. Development engineers can use this port to examine low-level behavior of the processor during run time such as by setting break points, single stepping, and reading debug registers.

The debug port of the processor is often connected to a separate connector provided on the motherboard of a computer, at least during development. This connector allows developers to interface a debug processor or test system to the connector and thereby debug software errors and detect hardware problems as they test initial system software versions.

SUMMARY OF THE INVENTION

In one general aspect, the invention features a portable computer that includes a housing having an outside surface. A processor is contained within the housing and has a bus port and a debug port. A debug connector is mounted at the outside surface of the computer housing and is operatively connected to the debug port.

The computer housing can include at least one peripheral interface slot defined by a portion of the outside surface of the computer, and the debug connector can be located in the peripheral interface slot. The interface slot can be a generally rectangular parallelepiped-shaped opening in the housing being defined by a opening in the housing at a first end and having a surface opposite the opening, the debug connector being located on the opposite surface within the interface slot. The debug connector can be directly electrically connected to the debug port. The computer can include a debug adapter that includes an input connector for connection to the debug connector, a series of buffers having inputs responsive to the input connector and an output connector responsive to outputs of the buffers. The computer can include a debug adapter including an input connector for connection to the debug connector and an output connector for connection to a debug or test system. The computer can further include a peripheral interface connector operatively connected to the bus port, and the debug adapter can further include a peripheral input connector for connection to the peripheral interface connector operatively connected to a peripheral output connector. The debug connector and the peripheral interface connector can form part of a ganged connector. The computer housing can be a clam-shell case. The processor can include data registers and with the debug port allowing access to the registers via a boundary scan connection. The computer can include a ganged connector that includes the debug connector and a peripheral interface connector.

In another general aspect, the invention features a portable computer that includes means for enclosing a computer, processing means enclosed by the means for enclosing and including means for communicating debug information, and means for conveying the debug information to a connection to an external interface without disassembling the means for enclosing.

The computer can include means responsive to the means for conveying for buffering the debug information. The computer can include means for conveying the debug information from the connection to the external interface and for conveying peripheral interface signals to a peripheral interface device.

In a further general aspect, the invention features a method of operating a portable computer that includes connecting a debug adapter to a debug connector at an outside surface of a computer, running a program on the computer, and obtaining debug information from the debug adapter.

The method can include buffering the debug information by the debug adapter. The method can include providing peripheral interface signals to a peripheral interface device through the debug adapter. The steps of connecting and obtaining can take place through a slot in the housing of the computer. The step of running the program can include viewing results of the program on a screen of the computer and interacting with the program via its keyboard. The method can include modifying and re-running the program on the computer. The step of obtaining debug information can obtain data debug register contents from a processor within the computer. The method can include transporting the computer from one building to another with the debug adapter connected and repeating the steps of running and obtaining for the same program.

Systems according to the invention may be advantageous in that they permit software developers to diagnose software errors during development of a portable computer without disassembling the computer. This can save engineering time, lower the chance of damage, and allow the engineer to focus on the software errors, rather than on assembly and disassembly of the machine. Systems according to the invention may also permit development to take place while the various parts of the portable computer, such as the screen and keyboard, are in place, instead of in an unstable disassembled configuration. And even drives that use the same peripheral slot as the debug adapter can be accessed during debugging.

Systems according to the invention may also permit software engineers to use their personal portable computers as development systems to develop and debug software for other machines. This may allow development to take place in different locations, thereby making the development process more flexible and efficient. Furthermore, providing for a buffering of the processor debug port off of the processor board allows that board to be more compact and less expensive. Features of the invention can be particularly advantageous for highly miniaturized portable computers, which are often difficult to disassemble.

DETAILED DESCRIPTION OF AN ILLUSTRATIVE EMBODIMENT

Figure 1:
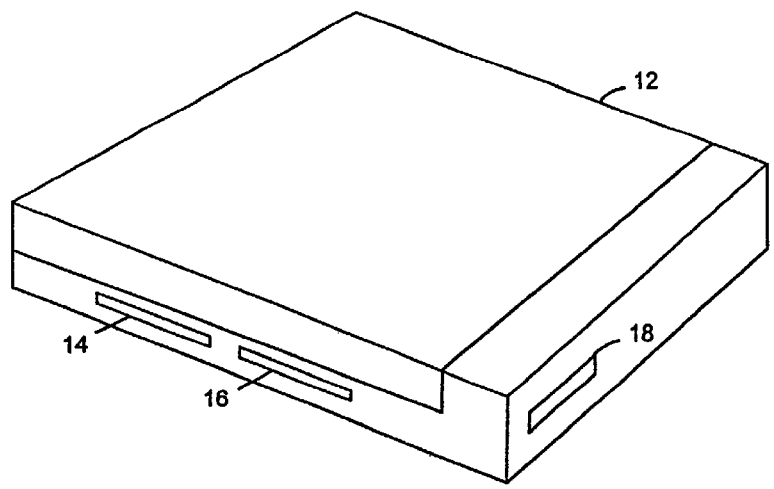
FIG. 1 is a perspective outline drawing of a portable computer according to the invention.

Referring to FIG. 1, a portable computer system 10 is enclosed in a portable housing 12, that includes a processor, memory, and user interface hardware, such as a keyboard, touch pad, and display screen. The housing can be in the form of a clam-shell case with the keyboard and display being mounted in opposing hindgedly attached portions. The housing can also include a docking connector 18, which mates with a corresponding docking connector on a docking interface.

The main computer housing defines one or more peripheral interface slots 14, 16. Each of these slots includes a connector that allows a peripheral device, such as a floppy disk drive, network interface, or modem, to be fully or partially inserted into its slot and carried with the computer. The slots can be rectangular parallelepiped cavities in the housing, with the connector being located on an opposite face from an opening in the housing formed by the cavity, such that a peripheral device can slide into the slot and mate with its connector in a single stroke.

Figure 2:
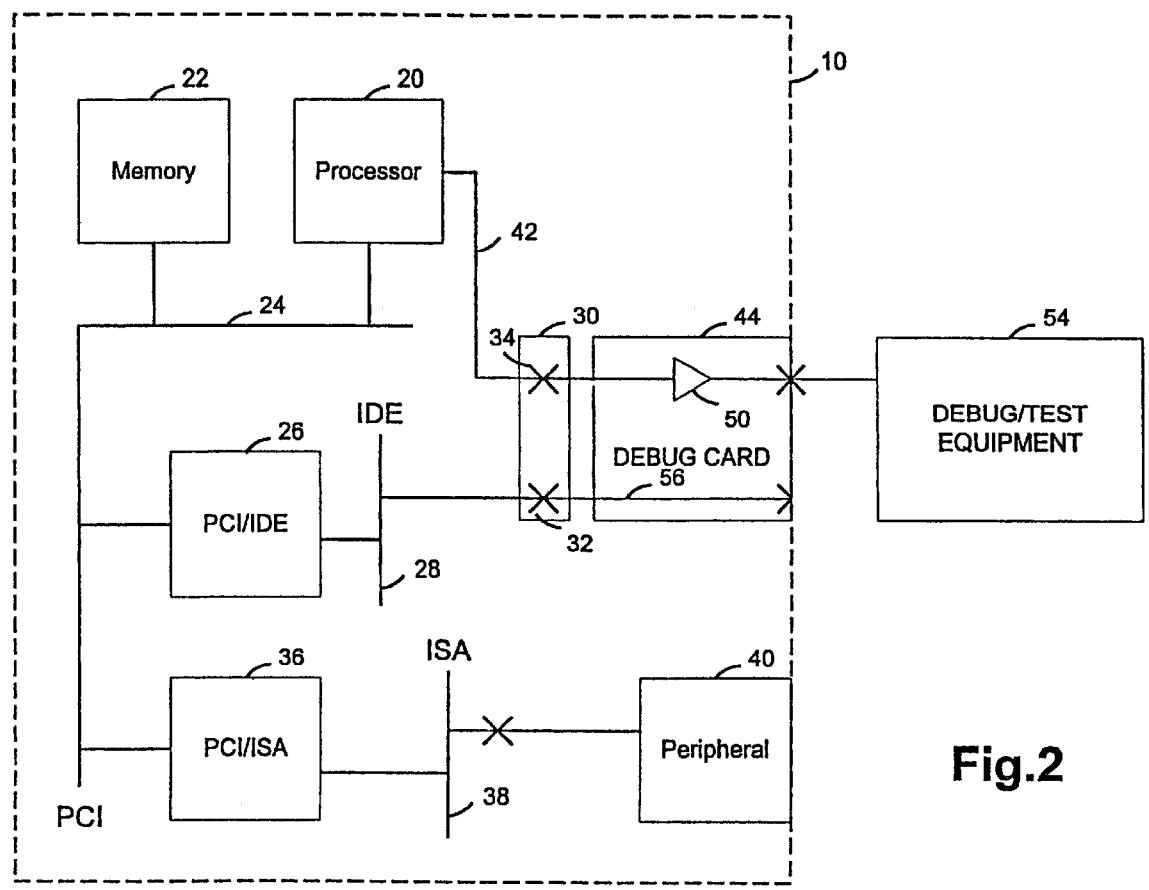
FIG. 2 is a block diagram of relevant portions of the portable computer of FIG. 1, shown connected to a debug/test processor.

Referring also to FIG. 2, the computer housing 12 includes a processor 20 and memory 22 each having a port operatively connected to a first bus 24. The processor can be a Pentium® processor, and this first bus can be a PC-Interactive (PCI) bus, which is a relatively high-speed mezzanine bus with block transfer and automatic configuration capabilities. The Pentium® processor is described in "Pentium Processor Family Developer's Manual," 1997, available from the Intel Corporation, of Santa Clara, Calif.

Also provided in the computer housing 12 is a first bridge 26, which is operatively connected between the first bus 24 and a second bus 28. The second bus can be an Integrated Drive Electronics (IDE) interface bus, which is based on the ISA bus and designed to handle power and data signal interfaces between a computer and integrated disk controller and drive. A first peripheral device connector 32 for the first peripheral interface slot 14 (e.g., a drive bay), which forms a first portion of a larger (ganged) connector 30, is operatively connected to the second bus to allow a peripheral device, such as a hard drive, to be connected to the second bus.

A second bridge 36 is also operatively connected to the first bus 24 and to a third bus 38. The third bus can be an Industry Standard Architecture (ISA) bus. The ISA bus is an extension of the IBM-XT bus architecture, which runs at 8 MHz and allows for bus mastering. This bus can be connected to an interface connector associated with the second peripheral interface slot 16 to allow a peripheral device, such as a floppy drive, to be connected to the ISA bus.

Figure 3:
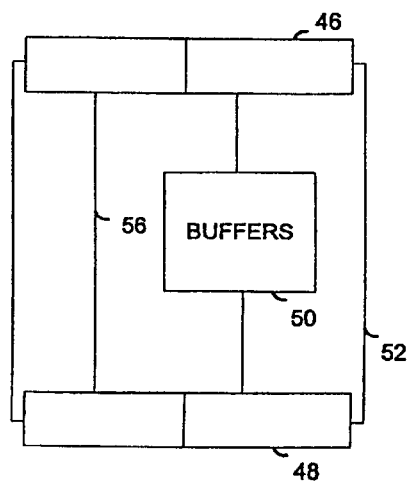
FIG. 3 is a elevation view diagram of a debug card for the portable computer of FIG. 1.
Figure 4:
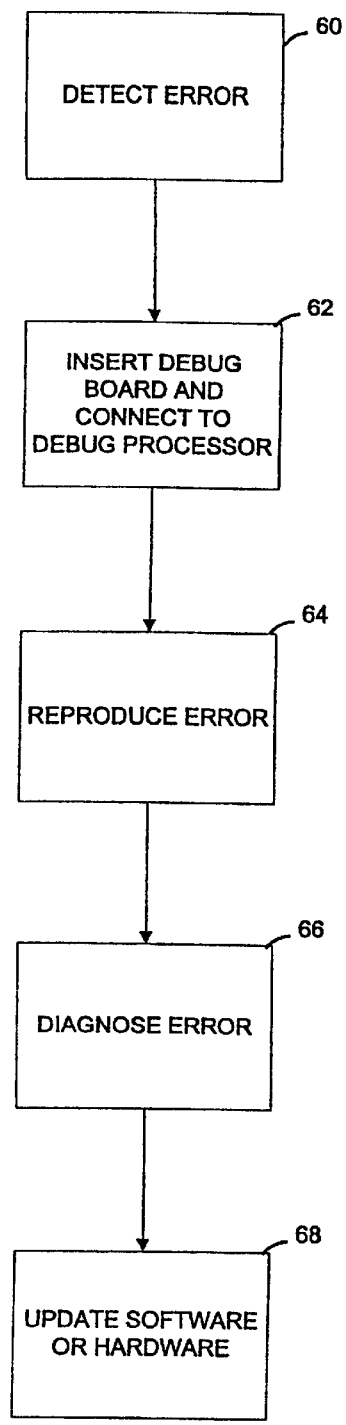
FIG. 4 is a flowchart illustrating the development of software using the portable computer of FIG. 1.

Referring also to FIG. 3, the processor 20 has a debug port that is operatively connected to a debug bus 42. This debug bus is operatively connected to a second portion 34 of the connector 30. A debug card 44 can be inserted into the first peripheral interface slot 14 and connected via a debug card input connector 46 to the second portion 34 of the connector. The debug card includes a series of buffers 50 that have buffer inputs operatively connected to the debug card input connector 46 and outputs operatively connected to a debug card output connector 48. The buffers can have power supply inputs responsive to either the input or output connector, or could even be battery-powered. With a Pentium® processor, the debug port can be a level 1 Pentium® debug port, although a level 2 port could also be used if necessary.

The debug card output connector 48 can be located opposite the debug card input connector 46 on a substrate or in a housing 52 that fits within the first peripheral interface slot 14. The output connector can then mate with a connector on a cable leading to a piece of debug or test equipment 54. The debug card 44 can also include a ganged connector arrangement that includes a pass-through connection 56, allowing a peripheral to be connected to the peripheral device connector 32 while the debug card is in place.

In operation, referring to FIGS. 1–4, during the course of developing system software for the computer 10, an engineer may detect an error (step 60). If the cause of the error is not readily apparent from his or her software code, the engineer may insert the debug board 52 into the first peripheral interface slot 14 and connect a cable from the debug or test processor 54 to the output connector 48 of the debug card (step 62). If necessary, the engineer can also connect a peripheral device to the pass-through portion of the debug board.

The engineer will then attempt to re-run the system software on the computer 10 in such a way as to reproduce the error (step 64). While the error is being reproduced engineer can set break points, single step, look at debug register contents, and perform other debugging operations. Based on these operations, the engineer can diagnose the software error (step 66). He or she can then take corrective action by changing the computer's software or hardware (step 68).

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A portable computer, comprising:
   a housing comprising hingedly attached ponions that encase circuitry within the portable computer;
   a display device positioned in one portion of the housing;
   an input device positioned in another portion of the housing;
   at least one processor contained within the housing, said processor comprising a bus port and a debug port,
   a debug connector mounted at the outside surface of the computer housing and operatively connected to the debug port;
   a peripheral connector also rnounted at the outside surface of the computer housing and operatively connected to the bus port;
   wherein the computer is configured to execute a software program that involves user interaction via the keyboard and display screen and wherein the computer is firther configured to accept a debug adapter that simultaneously connects to the debug connector and the peripheral connector.

2. The portable computer of claim 1 wherein: the debug connector and peripheral connector are accessible via a common peripheral interface slot at the outer surface of the computer housing.

3. The portable computer of claim 2 wherein: a software program running on the portable computer may be debugged without disassembling the computer by coupling the computer to debug equipment via the debug adapter.

4. The portable computer of claim 3 wherein: an external peripheral device and debug equipment may be simultaneously coupled and operated by a user who is debugging the computer system by interacting with the input and display devices on said computer.

5. The portable computer of claim 2 wherein: the peripheral interface slot is configured to accept a standard peripheral interface adapter when debug adapter is not installed.

6. A method of debuging a filly assembled notebook computer comprising:

connecting a debug adapter to a debug connector and a peripheral connector located in a peripheral interface slot on the computer;

running a software program on the computer that involves user interaction with input and output devices on the notebook computer; and simultaneously enabling debug operations and enabling peripheral device communications with an internal bus through the debug adapter.

7. The method of claim 6 wherein enabling debug operations comprises:

controlling execution of a processor within the notebook computer via a debug port in the processor that is accessible via the debug adapter;

obtaining processor data register contents from the debug adapter;

setting software routine breakpoints using the input and output devices;

enabling single-step processing of the software routine; and modifying the software routine or hardware settings and re-running the software on the notebook computer.

8. The method of claim 7 further comprising: buffering the data by the debug adapter.

9. The method of claim 6 wherein enabling peripheral device communications comprises:

accessing an internal bus with a connector in the debug adapter; and bilaterally passing bus information through the debug adapter between the notebook computer and a peripheral device that is coupled to the debug adapter.

10. A debug adapter for use in debugging an assembled portable computer comprising:

a first connector for coupling to a computer processor debug port;

a second connector for coupling to an internal data bus;

a third connector for coupling to external test equipment;

a fourth connector for coupling to external peripheral devices;

wherein debug data is transmitted between the first and third connectors and bus data is traitted between the second and fourth connectors and wherein the debug adapter permits simultaneous use of a single slot in portable computer for debugging and peripheral device communications.

11. The debug adapter of claim 10 further comprising:

data buffers between the first and third connectors for buffering the debug data; wherein the data buffers are powered by power supply inputs from either the first or third input connectors.

12. The debug adapter of claim 10 further comprising:

data buffers between the first and third connectors for buffering the debug data; wherein the data buffers are battety powered.

* * * * *

UNITED STATES PATENT AND TRADEMARK OFFICE
CERTIFICATE OF CORRECTION

PATENT NO.   : 6,321,349 B1                                          Page 1 of 1
DATED        : November 20, 2001
INVENTOR(S)  : Rick Hennessy It is certified that error appears in the above-identified patent and that said Letters Patent is hereby corrected as shown below:

<u>Column 6,</u>
Line 5, change "filly" to read -- fully --; and
Line 17, change "traitted" to read -- transmitted --.

Signed and Sealed this

Twenty-third Day of July, 2002

*Attest:*

*Attesting Officer*

JAMES E. ROGAN
*Director of the United States Patent and Trademark Office*